United States Patent [19]

Häfner

[11] Patent Number: 4,984,468
[45] Date of Patent: Jan. 15, 1991

[54] PRESSURE SENSOR AND METHOD FOR MANUFACTURING IT

[75] Inventor: Hans W. Häfner, Aichach-Walchshofen, Fed. Rep. of Germany

[73] Assignee: Pfister GmbH, Augsburg, Fed. Rep. of Germany

[21] Appl. No.: 483,704

[22] Filed: Feb. 23, 1990

[30] Foreign Application Priority Data

Mar. 7, 1989 [DE] Fed. Rep. of Germany ....... 3907202
Jun. 14, 1989 [DE] Fed. Rep. of Germany ....... 3919411

[51] Int. Cl.$^5$ ............................ G01L 7/08; G01L 9/06
[52] U.S. Cl. ......................................... 73/727; 29/595; 29/621.1; 338/4
[58] Field of Search .................. 73/726, 727, 720, 721, 73/715, 716, 717, 718, 719, 722, 723, 724, 725, 728; 338/4, 42; 29/595, 610.1, 621.1; 361/283

[56] References Cited

U.S. PATENT DOCUMENTS

| | | | |
|---|---|---|---|
| 4,127,840 | 11/1978 | House | 73/727 |
| 4,389,895 | 6/1983 | Rud | 73/718 |
| 4,434,451 | 2/1984 | Delatorre | 73/718 |

Primary Examiner—Donald O. Woodiel
Attorney, Agent, or Firm—Armstrong, Nikaido, Marmelstein, Kubovcik, & Murray

[57] ABSTRACT

A pressure sensor having high measuring accuracy comprises a ceramic base of hat-like shape having a stable clamping portion, a diaphragm support portion spaced from said clamping portion and a flexible transition portion connecting said clamping portion with said diaphragm support portion; a ceramic diaphragm deformable in dependence on pressure applied thereto, formed unitary in said diaphragm support portion at a top surface thereof; and transducer means applied to a main surface of said diaphragm for converting any deformation of said diaphragm into electric signals representing said pressure applied to said diaphragm. In a manufacturing method for such a pressure sensor the diaphragm and the base comprising the clamping portion are formed in one method step into a homogenous sensor body prior to burning.

19 Claims, 2 Drawing Sheets

PRESSURE SENSOR AND METHOD FOR MANUFACTURING IT

FIELD OF THE INVENTION

The invention relates to a pressure sensor including a ceramic base and a ceramic diaphragm connected thereto deformable in dependence on the pressure applied, and the invention further relates to a method for manufacturing such a pressure sensor.

BACKGROUND OF THE INVENTION

The DE-A-38 17 695 (JP-P No. 62-129360) discloses a ceramic pressure sensor of the type defined and a method of manufacturing thereof. First, a green ceramic diaphragm is formed. Furthermore, a green ceramic base plate is formed. These two elements are then put together to a laminar body (by applying pressure) which is subsequently burned to form by connecting at the contiguous contact surfaces in a unitary burned ceramic sensor body.

With this sensor several method steps are necessary since the diaphragm and the base are formed separately, then combined to a green element and only burned thereafter. In particular with the manufacture of such a pressure sensor having a cavity provided adjacent to the diaphragm this manufacturing method is rather complex since there is inserted a further frame-like spacing element between the diaphragm and the base and the opening for the cavity in the spacing element and the passage in the base element must be filled with a sublimable disc insert and a rod insert, respectively, before putting these individual parts on each other to one unit and burning it together.

This combined burned sensor body is inserted into a housing and is clamped at the peripheral portion close to the diaphragm. This results in tensions in the diaphragm negatively affecting the measuring accuracy.

The U.S. Pat. No. 4,382,247 discloses a pressure sensor comprising a flexible diaphragm attached as a separate element to a plane rigid base plate. Depart from the vaguely defined shape of the diaphragm resulting in considerable inaccuracies of measurement manufacturing of the known sensor is complex.

The U.S. Pat. No. 4,481,497 discloses a pressure sensor employing a ceramic substrate and a ceramic diaphragm formed as separate parts and connected together. The substrate is provided with a cavity allowing deformation of the diaphragm. The diaphragm is provided with transducer means comprising a resistor bridge. Again, the known pressure sensor is complex in design and costly to be manufactured.

The DE-A-35 10 042 (U.S. Ser. No. 591,728) discloses a pressure sensor comprising a pressure transducer and a pressure measuring capsule. The capsule includes a membrane in surface contact with a diaphragm of the pressure transducer. The membrane of the capsule forms one wall of a cavity further defined by an opposite rigid plate and flexible transition portions connecting this plate with the membrane. Again, the design of the known pressure transducer is complex and the manufacturing thereof costly.

The U.S. patent application Ser. No. 322,142 relates to a pressure transducer comprising a rigid body formed of ceramic material with a ring-like shape having a central opening and a radially extending plane end surface, a diaphragm unitary with the rigid body and covering the opening at an end surface opposite to the plane end surface and thickfilm resistor means applied to at least one of two main surfaces of the diaphragm. Whilst this pressure transducer has a relatively simple design and is easy to be manufactured, it is difficult to position and fix it to a measuring position with the tendency of the diaphragm to be inadvertently tensioned or twisted.

SUMMARY OF THE INVENTION

It is an object of the present invention to provide a pressure sensor of very simple design.

It is a further object of the invention to provide a pressure sensor having high measuring accuracy and being simply to be manufactured.

It is a still further object of the invention to provide a method for manufacturing a pressure sensor in a very simple manner.

Accordingly, the pressure sensor of the invention comprises:
- a ceramic base of hat-like shape having a stable clamping portion, a diaphragm support portion spaced from said clamping portion and a flexible transition portion connecting said clamping portion with said diaphragm support portion;
- a ceramic diaphragm deformable in dependence on pressure applied thereto, formed unitary in said diaphragm support portion at a top surface thereof; and
- transducer means applied to a main surface of said diaphragm for converting any deformation of said diaphragm into electric signals representing said pressure applied to said diaphragm.

According to another aspect of the invention there is provided a method for manufacturing a pressure sensor comprising the steps:
- providing a mould according to the final shape of said pressure sensor including in a unitary form a stable clamping portion, a diaphragm support portion incorporating a diaphragm and a flexible transition portion connecting said clamping portion with said diaphragm supporting portion;
- filling said mould with ceramic powder;
- pressing said powder in said mould up to a final shape of said pressure sensor;
- removing said green pressure sensor from said mould;
- burning said green pressure sensor; and
- applying transducer means on an exterior main surface of said diaphragm.

Since the diaphragm, the base, and the clamping portion form one unitary ceramic sensor body preferably in one method step a particularly simple manufacture and a high connection stability between the diaphragm and the clamping portion is achieved since neither separate connecting material nor contact surfaces are provided between these two functional elements. The combined forming before burning of the sensor body results in a homogenous transition specifically in the transitional connecting portion between the diaphragm and the clamping portion. Since the clamping portion is remote from the diaphragm no negative effects or tensions are caused in the diaphragm.

In view of the unitary forming of the green sensor body the regions of main loading specifically the transitional radii between the clamping portion and the diaphragm may be simply adapted to the pressure range desired. In view of the specifically high connection stability the sensor body as such constitutes a pressure sensor unit with connecting leads or connecting threadings formed in the sensor body as such without requiring additional housings, sealings, and other fixing elements.

The manufacturing of the sensor body in one forming step further results in a reduction of the overall size of the pressure sensor and an essential reduction in the number of required method steps such that the production costs may be reduced considerably. At least the separate forming of the diaphragm and the clamping plate, respectively, may be omitted as well as the putting together of the individual elements by stacking them to a laminated structure.

The pressure sensor according to a preferred embodiment provided with a cavity and a threaded connection thereto is particularly advantageous to be produced and directly connectable to a pressure source. In this case separate housings costly to be manufactured for surrounding the known sensor body are completely avoided, where a ceramic support plate forming a diaphragm having a resistor network thereon is placed into a cup provided with a sealing cover. Such a costly surrounding the sensor is no more necessary with this embodiment of the invention.

DESCRIPTION OF PREFERRED EMBODIMENTS

Figure 1:
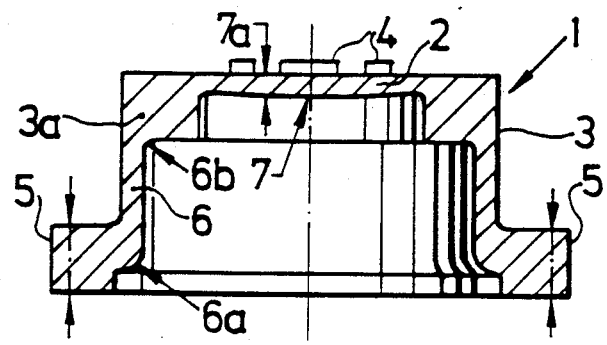
FIG. 1 is a sectional view of a first embodiment of a sensor body of a pressure sensor.

In FIG. 1 there is illustrated an essentially cylindrical hat-like sensor body 1 essentially comprised of the two functional portions of a relatively thin deformable diaphragm 2 and a relatively stable base 3 having a clamping portion 5. On a surface of the diaphragm several measuring resistors 4 are applied, in particular printed thereon as a bridge circuit in thick film technique by means of the known screen printing method which resistors sense the deformation of the diaphragm 2 due to loading thereof.

The lower rim of base 3 is formed as the stable rigid clamping portion or ring 5 by which the sensor body 1 is connectable to the measuring position as indicated by means of the double arrows. The clamping portion 5 of base 3 is connected with a diaphragm support portion 3a via a relatively flexible transition tube portion 6 having two curved transitions 6a, 6b with defined radii of curvature. Upon non-uniform force introduction in view of the clamping forces and/or temperature expansions this enables compensation movements in a plane perpendicular to the center axis. This flexible design of the tube portion 6 and the transitions 6a, 6b tends to avoid tensions in the diaphragm and, therefore, measuring inaccuracies.

Figure 2:
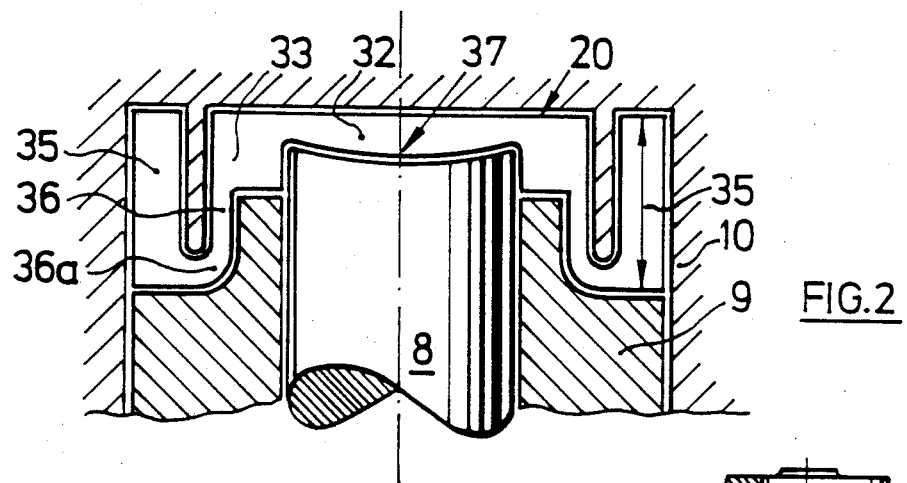
FIG. 2 shows a manufacturing mould for the sensor body.

The diaphragm 2 is formed in its center region with a larger diaphragm thickness 7a such that there is provided an enforcement 7 of the diaphragm 2 which is exaggeratedly illustrated in FIG. 2. This enables high pressure loading of the diaphragm 2 with high sensitivity responses.

In FIG. 2 the manufacturing of a sensor body 20 by a simultaneous forming both of a diaphragm 32 and a base 33 with its clamping portion 35 of ceramic material in one step is illustrated. In contrast to the illustration in FIG. 1 the clamping portion 35 projects upward up to the top side of the diaphragm 32 resulting in a further increased defined bending flexibility of the transition tube portion 36. Furthermore, with such a design the top side of the diaphragm 32 and the top side of the clamping ring 35 may be treated in one method step, f. i. lapped and may be jointly coated or in a screen printing method jointly printed after burning of the sensor body 20.

For manufacturing the sensor body 20 first a ceramic powder is filled into the mould cavity between a pressing piston 8 and a complementary mould portion 10 and is highly densified by the mutual high pressure. This results in a desired diaphragm enforcement 37 of the diaphragm 32 the displacement of the pressing piston 8 being adjustable for achieving different diaphragm enforcements 37 (for adaptation to the actually desired pressure range).

Of high importance with the joint forming of the sensor body 20 is a pressing tube 9 surrounding the pressing piston 8 and axially adjustable thereto which pressing tube 9 in particular forms the clamping portion 35, the transition tube portion 36, and the transitions 36a with defined radii and wall thicknesses. By forge-like pulsing of the pressing piston 8 and the pressing tube 9 in respect of the complementary stationary mould portion 10 a particularly homogenous structure of the unburned or green sensor body 1 is achieved having particularly high stability without providing any contact surfaces between several elements as usual up to now. The unitary sensor body so formed is then burned as well known in the art.

Figure 3:
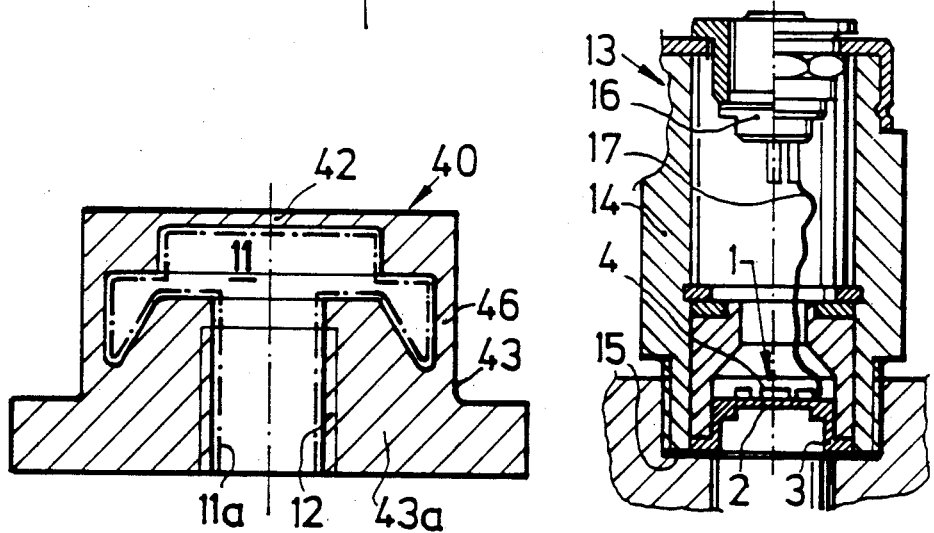
FIG. 3 is a sectional view of a second embodiment of a closed pressure sensor.

In FIG. 3 a sensor body 40 of a further embodiment is illustrated. In view of the high stability of the material there may be provided a cavity 11 with a preferably threaded connection 12, formed in a lower portion 43a of a base 43 during the forming of the ceramic green element, and representing with this embodiment the clamping means. For forming the cavity 11 during the moulding process, there is used a correspondingly formed mould insert 11a (in dash-dot-line) made of evaporable or sublimable material, f. i. hexabrome benzine. By means of the threaded connection 12 as a clamping means a direct connection is specifically simple to a pressure duct, exemplary a hydraulic duct of a machine or a brake duct of a vehicle. Tensions caused by threading-in will be kept away from a diaphragm 42 by a transition tube portion 46. Thus, a separate housing for envelopping or supporting of the sensor body 40 is no more necessary. This embodiment features a particularly simple design, few manufacturing steps, and low manufacturing costs.

Figure 4:
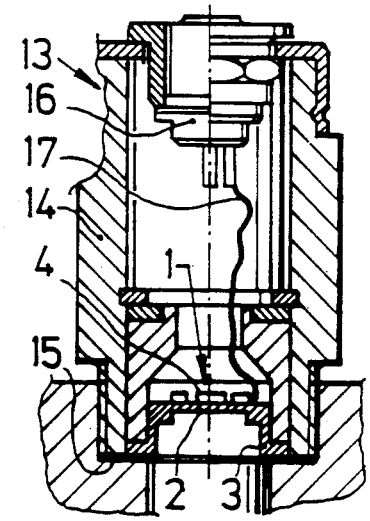
FIG. 4 is an overall view of the pressure sensor.

In FIG. 4 the sensor body 1 according to FIG. 1 is arranged in a sensor holder 13 connected to a measuring position in a thread-in housing 14 via a sealing 15. Within the thread-in housing 14 a measuring amplifier 16 is provided processing the resistance changes at the diaphragm 2. In this case the sensor body 1 is directly connectable to the measuring position without separate clamping plates as necessary with known devices discussed above. As may be gathered from this arrangement the diaphragm 2 may be directly loaded by the pressure fluid to be monitored, f. i. a brake fluid of a vehicle without any further transmission media. Additionally, since the ceramic diaphragm 2 is chemically resistant this arrangement is particularly adapted for use with chemical aggressive fluids. In this case the measuring network comprising the resistors 4 is provided on that diaphragm surface opposite of the pressure fluid such that the resistors 4 and their wiring and the connecting cable 17 will not come into contact with the pressure fluid.

Figure 5:
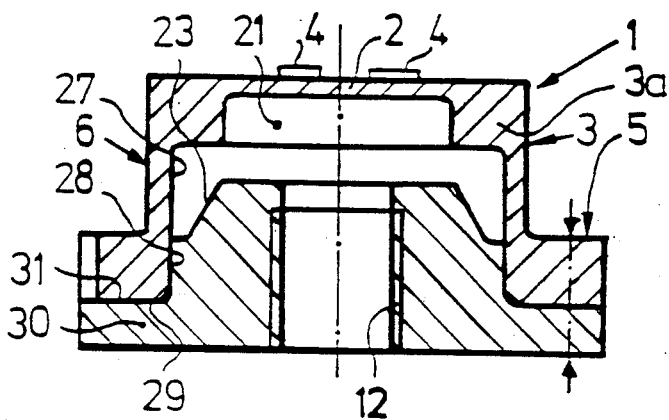
FIG. 5 is a sectional view of a third embodiment of a sensor body.
Figure 6:
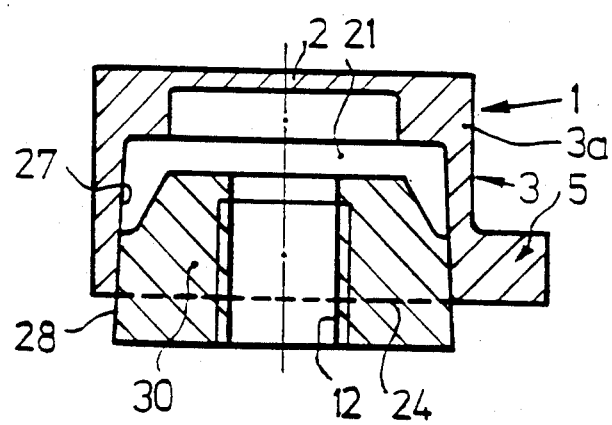
FIG. 6 is a sectional view of a fourth embodiment of a sensor body.

FIGS. 5 and 6 illustrate further embodiments of the invention.

In FIG. 5 there is illustrated as a main element of a pressure sensor according to the invention an essentially cylindrical pot-like or hat-like sensor body 1 unitary formed of a relatively thin deformable diaphragm 2 and a relatively stable hat-like base 3 as well as a clamping portion 5. On the diaphragm 2 several measuring resistors 4 are applied specifically in a bridge circuit in thick-film technique in order to sense the deformation of the diaphragm 2 by resistance changes upon pressure application. It should be noted that for sake of clarity the same reference numerals are used for parts similar to those of FIGS. 1 and 3.

The periphery of the diaphragm support portion 3a is connected by a tube-like portion 6 to the clamping portion 5 which portion 6 has a certain elasticity due to its relatively thin design such that the transmission of tensions onto the diaphragm is avoided.

In the region of the portion 6 an inner surface 27 is provided within the base 3 which inner surface is formed preferably cylindrical and engages an opposite outer peripheral surface 28 of an insert element 30 in combined state of the sensor body 1 in a type of close fitting. In addition to this cylindrical contact surface between the inner surface 27 and the outer surface 28, further contact surfaces 29/31 are provided in a plane perpendicular thereto. These contact surfaces engage each other such that during the subsequent burning of the green sensor body 1 put together according to FIG. 5 a unitary sensor body 1 of the pressure sensor is formed by the connection at the contact surfaces 27/28 and 29/31.

The insert element 30 forms together with the opposite diaphragm 2 of the sensor body 1 a cavity 21 into which through a connection 12, preferably provided with a threading, fluid may be supplied, such that the latter loads the relatively thin diaphragm 2. As illustrated, the insert element 30 has a simple plug-like form without relief cuts such that it may be formed relatively simple of a ceramic mass and then inserted into the sensor body 1 formed of the same or essentially similar material and the base element 3 thereof. Thus, the cavity 21 is formed without the necessity of any mould inserts or the like. Therefore, the insert element 30 of simple outer shape may be produced very exactly such that it may be inserted with the engagement of its outer peripheral surface 28 with the correspondingly formed inner surface 27 of the base 3 with snugly fit. In the upper region 23 of the insert element 30 the outer peripheral surface 28 is tapered such that small balancing movements of the transition portion 6 are not impeded. This slight moving capability of the thin portion 6 avoids tensions of the diaphragm 2.

After burning of the sensor body 1 such fitted together the latter may be connected to a measuring position at the ring-like clamping portion 5 as indicated by the arrows. Alternatively, the pressure sensor may be mounted just by the threaded connection 12 such that no further fixing means are necessary and the flange-type clamping portion 5 may be omitted as illustrated in the left half of FIG. 6. In view of the offsetting of the contact surfaces 27/28 and 29/31 by essentially about 90° even with a high pressure loading of the cavity 21 there is no danger that the contact surface 29/31 may separate by peeling. In view of the connecting stability achieved, this pressure sensor is adapted for very high pressures.

In FIG. 6 a modified embodiment of a pressure sensor is illustrated using similar reference numerals. In contrast to FIG. 5, the cylindrical shape of the inner surface 27/outer surface 28 is modified to a slightly conical shape such that minor differences in the inner/outer diameters of the contact surfaces 27 and 28 may be compensated by a respective further pushing-in of the insert element 30 into the base 3. This permits an easy compensation of manufacturing tolerances, specifically resulting from the abrasive characteristic of the ceramic material when assembling the base 3 and the insert element 30 to sensor body 1. If desired, projecting regions of the insert element 30 may be cut off along a line 24 in the green state if a flush bottom side, f.i. for engagement with a sealing disk, is required. When mounting the presssure sensor only by the threaded connection 12 an insert element 30 slightly projecting beyond the bottom side of the sensor body 1 is of no harm. A sealing ring may be provided at the bottom side of the insert element 30.

By designing a two-part green sensor body combined of the base part including the diaphragm and an insert element, no mould insert for forming the sensor body is necessary any more but the pressure sensor is combined of two relatively simple ceramic green elements before burning. Therefore, in particular the inner surfaces of the cavity of the pressure sensor and, therefore, also the diaphragm may be manufactured more exactly and there is no danger of residues of any sublimable mould insert in the cavity. Additionally, the insert element is of simpler shape than the mould insert such that it is easier to manufacture by forming and pressing the green ceramic element.

The two individual elements are then combined to a green body and burned resulting in a unitary sensor body sintered together at opposing contact surfaces. In contrast to known devices with laminated individual elements and the mould insert surrounded thereby the contact surfaces do not extend in several planes one above the other but are put together plug-like at the periphery. This permits a higher positioning accuracy of the individual elements and a higher stability of the presssure sensor since these contact surfaces provide a larger contact area between the inner peripheral surface of the base element and the outer peripheral surface of the insert element. Furthermore, the contact surfaces extend in an essentially unloaded zone such that there are no tensions in the diaphragm and, therefore, the contact surfaces will not negatively influence the connection stability of the sensor body.

Particularly advantageous is the cylindrical shape of the insert element inserted into the correspondingly formed pot-like inner cylindrical surface of the base element prior to sintering. Furthermore, the clamping portion of the base element and the insert element may engage each other such that the two elements are clamped during the sintering process at the later clamping portion of the unitary sensor body.

For compensating manufacturing tolerances, the contact surfaces of the base element and the insert element may be formed conically complementary to each other such that even with manufacturing moulds having large tolerances or showing wearing a tight contact at the peripheral surfaces will be achieved prior to the sintering process. This results in a further simplification and cost reduction of the manufacturing method.

I claim:

1. A pressure sensor comprising:
   a ceramic base of hat-like shape having in axial arrangement a stable clamping portion, a diaphragm support portion spaced from said clamping portion and a flexible transition portion connecting said clamping portion with said diaphragm support portion;
   a ceramic diaphragm deformable in dependence on pressure applied thereto, formed unitary in said diaphragm support portion at a top surface thereof; and
   transducer means applied to a main surface of said diaphragm for converting any deformation of said diaphragm into electric signals representing said pressure applied to said diaphragm.

2. The pressure sensor of claim 1, wherein said main surface of said diaphragm is an exterior main surface flushing with said top surface of said diaphragm support portion.

3. The pressure sensor of claim 1, wherein said flexible transition portion has opposite ends merging with defined radii of curvature in opposite directions with an outer peripheral region of said diaphragm support portion and an inner peripheral region of said clamping portion, respectively, the amounts of said radii determining a range of pressure to be measured.

4. The pressure sensor of claim 3, wherein said diaphragm support portion and said clamping portion are formed as rings of essentially rectangular cross section.

5. The pressure sensor of claim 1, wherein said diaphragm support portion and said clamping portion are formed as rings of essentially rectangular cross section.

6. The pressure sensor of claim 1, wherein said clamping portion essentially extends over a total cross section of said hat-like ceramic base thus forming a cavity defined by an inner end surface of said clamping portion, said ceramic diaphragm and said flexible transition portion, a connecting passage being provided in said clamping portion for supplying fluid, whose pressure is to be measured, to said cavity.

7. The pressure sensor of claim 6, wherein said connecting passage is provided with a threading used as a fixing means.

8. The pressure sensor of claim 6, wherein said diaphragm has a varying thickness increasing toward a center thereof.

9. The pressure sensor of claim 1, wherein a ceramic plug means is inserted into an inner space formed in said hat-like base thus forming a cavity defined by an inner end surface of said plug means, said ceramic diaphragm and said flexible transition portion, a connecting passage being provided in said clamping portion for supplying fluid, whose pressure is to be measured, to said cavity.

10. The pressure sensor of claim 9, wherein said plug means has formed thereon at its outer end surface a cylindrical flange having a radial plane surface for engagement with a complementary end surface of said clamping means.

11. The pressure sensor of claim 9, wherein a peripheral surface of said plug means and an inner peripheral surface of said hat-like base are tapered complementary to each other.

12. The pressure sensor of claim 9, wherein said connecting passage is provided with a threading.

13. The pressure sensor of claim 9, wherein said diaphragm has a varying thickness increasing toward a center thereof.

14. The pressure sensor of claim 1, wherein said diaphragm has a varying thickness increasing toward a center thereof.

15. A method of manufacturing a ceramic pressure sensor comprising the steps:
   providing a mould according to a final shape of said pressure sensor including integrally formed in axial arrangement a stable clamping portion, a diaphragm support portion spaced therefrom, and incorporating a diaphragm and a flexible transition portion connecting said clamping portion with said diaphragm supporting portion;
   filling said mould with ceramic powder;
   pressing said powder in said mould up to said final shape of said pressure sensor;
   removing said green pressure sensor from said mould;
   burning said green pressure sensor; and
   applying transducer means on a main surface of said diaphragm.

16. The method of claim 15, wherein a sublimable mould insert for forming a cavity in said pressure sensor is put into said mould prior to said filling step and said mould insert is sublimed during the buring step.

17. The method of claim 15, wherein said pressing step comprises pressing of two movable mould portions against said ceramic powder filled in a stationary mould portion, one of said movable mould portions forming said diaphragm being adjustable relative to said other mould portion forming said clamping portion and said diaphragm support portion for varying the thickness of said diaphragm.

18. The method of claim 15, wherein prior to burning said green pressure sensor a green ceramic plug is fittingly inserted into an essentially cylindrical opening to an extent that a cavity is formed defined by said diaphragm, said transition portion and an inner end face of said plug.

19. The method of claim 18, wherein said plug is formed by filling ceramic powder in a mould provided with a mould insert for forming a threaded passage through said plug.

* * * * *